Aug. 19, 1947.  L. DILLON  2,425,869
METHOD AND APPARATUS FOR LOGGING DRILL HOLES
Original Filed Aug. 28, 1936  2 Sheets-Sheet 1

LYLE DILLON,
INVENTOR.

BY
ATTORNEY.

LYLE DILLON,
INVENTOR.

BY *Lynn L. Steele*
ATTORNEY.

Patented Aug. 19, 1947

2,425,869

UNITED STATES PATENT OFFICE 2,425,869

METHOD AND APPARATUS FOR LOGGING DRILL HOLES

Lyle Dillon, San Gabriel, Calif., assignor to Union Oil Company of California, Los Angeles, Calif., a corporation of California Original application August 28, 1936, Serial No. 98,355. Divided and this application June 5, 1943, Serial No. 489,769

14 Claims. (Cl. 177—352)

This invention relates to drill hole testing and particularly to electrical and acoustical methods and apparatus for the determination of the stratigraphy of earth bore holes such as oil wells. This application is a division of my earlier application, Serial No. 98,355, filed August 28, 1936.

The primary object of this invention is to provide a method and apparatus by which subsurface measurements of bore hole stratigraphy, pressure, temperature, inclination and the like can be made within the depths of the bore hole and by which these measurements can be continuously transmitted to the ground surface without the necessity of employing expensive and troublesome electrical connecting cables.

The broad invention accordingly resides in a method and apparatus for making physical measurements such as formation and fluid temperatures, pressures and electrical properties and bore-hole inclinations within the depths of a bore hole, transforming the measurements into mechanical vibrations which are proportional to or indicative in character of the said measurements, transmitting these vibrations mechanically through the fluid in the bore hole or through the supporting cable or through the surrounding formations to the earth surface, detecting and amplifying these vibrations at the surface and ascertaining or recording the said measurements in accordance with the character of the thus originated and detected vibrations. The invention resides more specifically in a method and apparatus for measuring the electrical characteristics of the unitary portions of the penetrated formation strata within the depths of a bore hole such as an oil well, transferring these measurements into mechanical vibrations, the frequencies of which are functions of the said measurements, detecting, amplifying and measuring these mechanical vibrational frequencies received at the earth surface and determining therefrom the corresponding electrical measurement made within the bore hole.

Other objects and novel features of the invention will be evident hereinafter.

Figure 1:
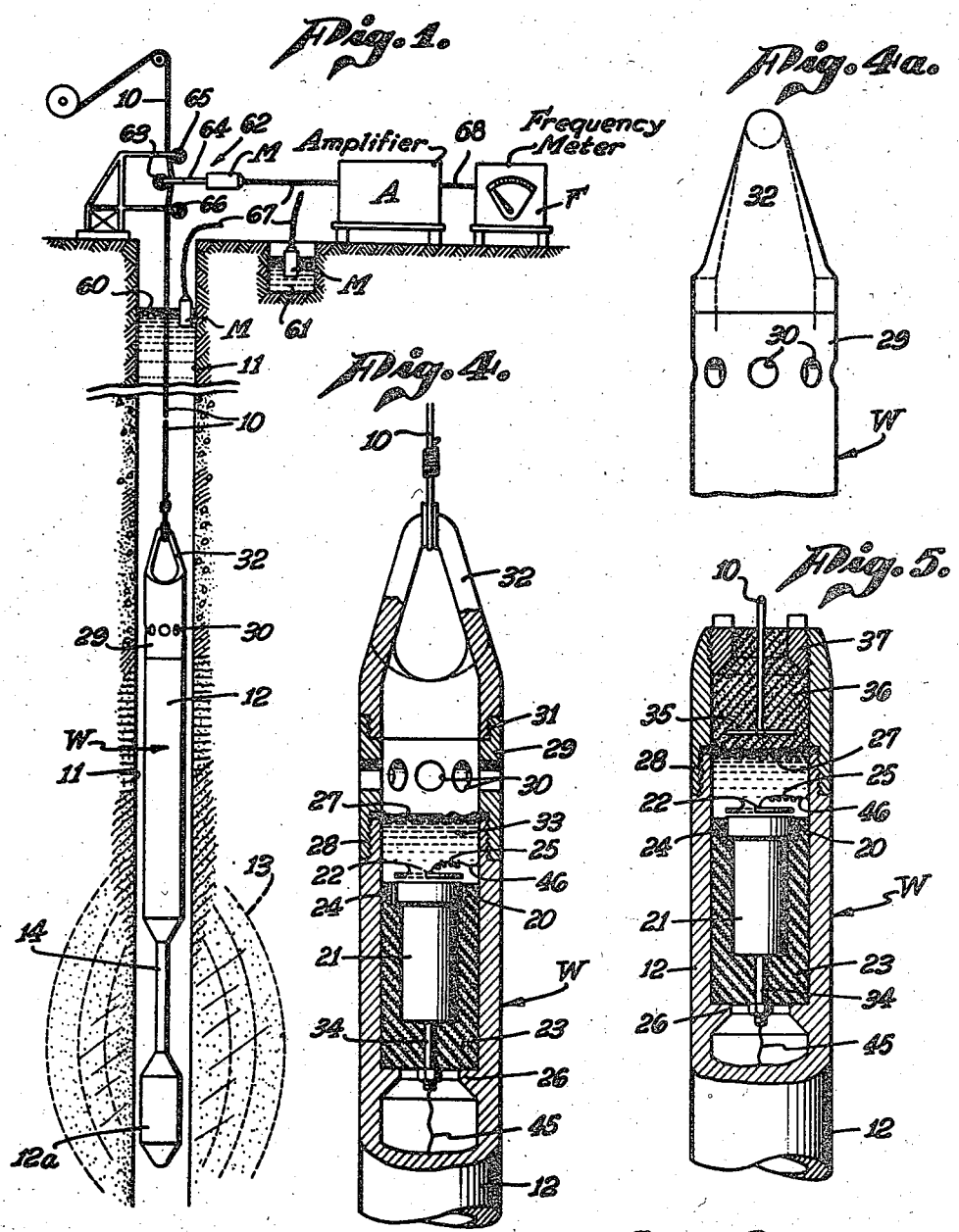
Figure 2:
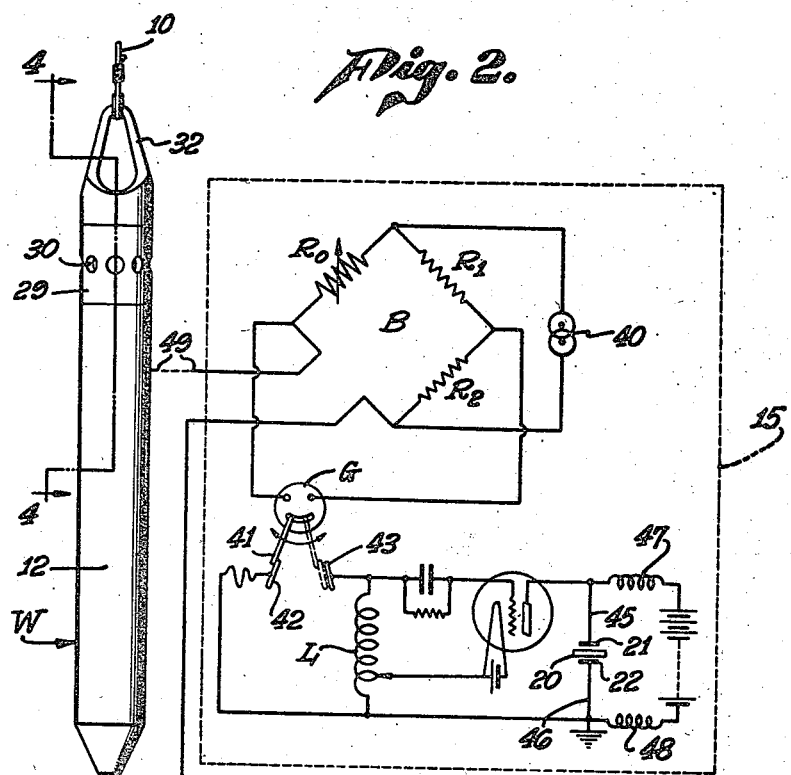
Figure 3:
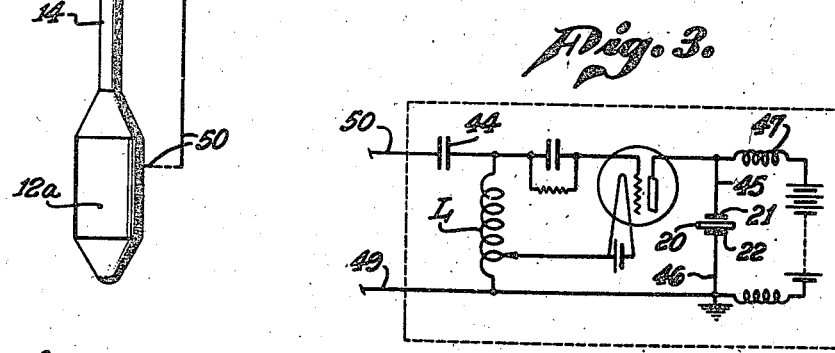
Figure 6:
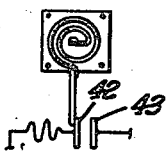
Figure 7:
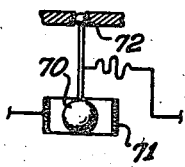

In the drawings, wherein typical embodiments of the invention are shown by way of illustration: Fig. 1 is a diagrammatic sectional elevation of a well bore hole showing the general arrangement of the apparatus. Fig. 2 is an enlarged elevation of the portion of the apparatus which is lowered into the bore hole, diagrammatically illustrating the apparatus and electrical circuits enclosed therein. Fig. 3 diagrammatically illustrates an optional arrangement of the enclosed apparatus and electrical circuits of Fig. 2. Fig. 4 shows a cross sectional view taken at line 4—4 of Fig. 2. Fig. 4a shows a side view of Fig. 4. Fig. 5 is an optional arrangement of the apparatus of Fig. 2 as it would appear taken on section line 4—4. Fig. 6 diagrammatically illustrates a temperature-operated device which may be optionally substituted for the galvanometer G of Fig. 2 when bore-hole temperature readings are made. Fig. 7 diagrammatically illustrates a gravity-operated device which may be substituted for the galvanometer G in Fig. 2 when bore-hole inclination determinations are made.

The apparatus is as follows:

Referring to Fig. 1, W is an instrument adapted to be lowered by an appropriate steel line or cable 10 into the earth bore hole 11. M is an electrical pickup device such as a crystal, magnetic, condenser or carbon microphone, geophone or the like device adapted to transform mechanical or seismic vibrations into fluctuating electrical currents of corresponding character or frequency. A represents an amplifier of the conventional vacuum tube design capable of great sensitivity and preferably selective or tunable over the range of frequencies employed. The frequency meter F is adapted to receive and indicate the frequencies or changes of frequencies of the amplified current from the amplifier A.

The instrument W which is that portion of the apparatus adapted to be lowered into the bore hole, comprises a liquid-tight metal cylindrical container 12 enclosing the electrical apparatus diagrammatically illustrated within the dotted enclosure 15 in Fig. 2, and also constitutes one electrode of the electrical bore hole testing system. Projecting from the lower end of the cylinder 12 and rigidly attached thereto by means of a coaxial, hollow insulating rod 14 through which conductor 50 extends, is another short metal cylinder 12a constituting a lower electrode.

At the upper end of the metal cylinder 12 above the compartment which hold the hereinbefore mentioned electrical apparatus, is positioned the vibration producing means which by way of illustration as in Fig. 4 comprises a piezoelectric crystal 20 adapted to be electrically energized by means of an alternating electric potential which is imposed between the lower heavy cylindrical electrode 21 and the upper light ring electrode 22. The lower cylindrical electrode 21 is coaxially supported within the upper section of the cylinder 12 and electrically insulated therefrom by means of rigid insulating material 23 such as Bakelite. The contact surfaces between the electrode 21, the insulation bushing 23 and the adjacent internal surface of the metal cylinder 12 are designed to be liquid-tight at high pressure differentials. The piezoelectric crystal 20 rests lightly upon the top of the cylindrical electrode 21 and fits loosely within the circular recess 24 at the top of the insulating body 23. The ring electrode 22 rests lightly upon the top surface of the piezoelectric crystal 24 and is retained in place and electrically grounded to the instrument body by means of spring connection 25 and conductor 46. A short distance above the top surface of the piezoelectric crystal 20 is a flexible corrugated metal diaphragm 27 making a liquid-tight division between the inner and outer portions of the upper section of the metal cylinder. The metal diaphragm 27 is clamped and held in liquid-tight contact with the upper end of the metal cylinder 12 by means of threads 28 and the perforated collar 29. The space 33 intermediate the top of the insulating body 23 and the piezoelectric crystal 20 and the bottom surface of the metal diaphragm 27 is entirely filled with an insulating oil of low viscosity.

The perforated collar 29 shown in Fig. 4 is open at the top and also carries a plurality of holes forming additional lateral passageways from the top of the diaphragm to the outside. At the top of the collar 29 is provided an open topped threaded connection 31 to which the supporting bail 32 is attached. Upon lowering the instrument into the well, fluid therein is free to flow around the bail into the top and through the holes 30 of the collar 29. The upper surface of the metal diaphragm 27 is thus in physical contact with the drilling fluid in the bore hole and vibrations originated by the piezoelectric crystal are free to pass upward through the oil through the metal diaphragm 27 and directly upward past the bail 32 or outwardly through the holes 30 into the drilling fluid contained in and surrounding the upper section of the instrument. The holes 30 in the collar 29 are provided to allow lateral passage as well as vertical passage of the vibrations into the drilling fluid within the bore hole, and to minimize accumulation of sand and cuttings upon the top of the metal diaphragm 27.

As the instrument is lowered into the fluid in the bore hole, the hydrostatic pressure of the drilling mud or other fluid in the well bears upon the metal diaphragm 27 and the resulting force is transferred in turn through the oil and through the insulating body 23 to the supporting lugs 26. The electrode 21 is electrically connected to the apparatus within the shell through rod 34 which makes liquid-tight contact through the insulating body 23.

In Fig. 5 is shown an optional arrangement of the mechanism within the upper end of the cylinder 12 of the apparatus W. Here the arrangement of the piezoelectric crystal and its associated electrodes are substantially the same as that described hereinabove, but instead of supporting the cylinder by means of the steel line connection to the top of the bail 32 the steel line 10 enters the top of the instrument and is attached to a metal disk 35 which is in turn solidly imbedded in an elastic rubber body 36. This rubber body is flexibly held under pressure within the top of the cylinder so as to transfer the weight of the instrument to the steel line 10 through the threaded ring nut 37. This elastic rubber body 36 rests under compression in solid contact upon the upper surface of the metal diaphragm 27, and vibrations originating at the piezoelectric crystal 24 will be transmitted through the oil 33 through the diaphragm 27 and by way of the elastic body 36 into the wire line 10 in the form of longitudinal vibrations.

Referring to Fig. 2, the apparatus diagrammatically illustrated within the dotted enclosure 15 is enclosed within the steel cylinder 12 and is adapted to the measurement of electrical resistivities of unitary portions of surrounding bore hole formations adjacent the cylinder 12 and the lower electrode 12a. B represents the four legs of a Wheatstone bridge with a low frequency alternating current source 40 connected across two legs thereof and an alternating current galvanometer G connected across the opposite two legs thereof. The alternating current supply is of such low frequency that inductance and capacitive effects of the bridge circuit, associated electrical connections and formation are negligible, the reversal of the current serving only to prevent undesirable electrode polarizing effects. The resistances $R_1$ and $R_2$ may ordinarily be of equal value. Variable resistance $R_0$ is employed for obtaining a balancing adjustment of the bridge circuit. Two legs of the Wheatstone bridge circuit are connected through conductors 49 and 50 across the electrodes 12 and 12a.

The galvanometer G carries upon the end of its moving arm 41, which is a strip of insulating material, a metal plate 42. Adjacent the metal plate 42 is a stationary metal plate 43 of similar size, the two plates 42 and 43 constituting the opposite elements of a variable capacity. These elements 42 and 43 are connected in shunt to an inductance winding L which in turn constitutes the frequency control portion of a conventional self-oscillating vacuum tube circuit. Such self-oscillating vacuum tube circuits are well understood and for this reason the apparatus and operation of the vacuum tube oscillator will not be described in detail except to indicate that the piezoelectric crystal 20 is connected to the plate output circuit thereof between electrodes 21 and 22 by means of electrical conductors 45 and 46. Inductances 47 and 48 serve to prevent the alternating component of the plate output current from being shortcircuited through the plate voltage supply batteries.

Fig. 3, as stated hereinabove, illustrates an optional arrangement of the apparatus enclosed within the dotted rectangular enclosure 15. Here the conventional self-oscillating vacuum tube circuit is retained as before, but the inductance L is connected through the series condenser 44 directly in shunt to the electrodes 12 and 12a by means of the conductors 49 and 50 respectively. This circuit is thus adapted to measure directly variations in the dielectric properties of unitary portions or penetrated formations surrounding the bore hole and adjacent the two said electrodes.

The hereinbefore described electrical pickup device M may be positioned as shown in Fig. 1 either by partial immersion in the drilling fluid at the top of the bore hole 11 as shown at 60 or in contact with the earth surface or liquid within a shallow hole at the earth surface, as shown at 61, or in the case where the mechanical vibrations are transmitted through the supporting steel wire 10 as shown in the arrangement of Fig. 5, the pickup device may be connected through suitable linkages to a pulley which contacts the said steel wire 10 in a manner adapted to transfer the longitudinal vibrations through the steel wire to the pickup device as shown at 62. The apparatus for transferring the mechanical vibrations from the steel wire 10 to the electrical pickup device M as shown at 62 may comprise three pulleys making contact with the wire line and staggered as shown so as to produce a slightly angular deflection between the two outermost pulleys. Tension is thus applied against the middle pulley 63 from which the vibrations are transmitted through the linkage 64 to the said pickup device M. Electrical connection is made between the pickup device M to the amplifier A through a pair of conductors 67. The amplifier A is in turn connected to the frequency meter through a pair of electrical conductors 68.

The operation is as follows, considering first the apparatus as shown in Figs. 1, 2 and 4: Prior to lowering the well testing apparatus comprising the cylinders 12 and 12a into the fluid-filled bore hole, the resistance $R_0$ in the Wheatstone bridge B of Fig. 2 is adjusted to such a value that for all the changes of measured formation resistivities, the range of motion of the galvanometer G, due to the resulting unbalance of the Wheatstone bridge, will be suitable. This adjustment may be ascertained by preliminary test runs in an artificial bore hole containing drilling mud of the type employed in the well to be tested or by short preliminary runs within the actual bore hole to be tested. As the testing apparatus is lowered into the bore hole and the metal surfaces of the cylinders 12 and 12a which constitute the testing electrodes pass adjacent the edges of penetrated strata, the variations in resistance due to the different resistivities of the adjacent formations upon motion of the apparatus through the bore hole results in a balancing or unbalancing of the Wheatstone bridge B depending upon the before-mentioned adjustment of resistance $R_0$. The resultant motion of the elements of the galvanometer G causes motion of the condenser plate 42 relative to the opposite condenser plate 43. This relative motion of the condenser plate 42 will thus be a function of the changes of resistivities of the formations which are brought adjacent to the said electrode surfaces 12 and 12a of the testing apparatus during its motion throughout the length of the bore hole. Since these condenser plates 42 and 43 are electrically connected in shunt to the inductance L, which combination comprises the frequency control circuit of the self-oscillatory vacuum tube circuit, the frequency of the output electrical current therefrom will be varied in accordance with the function of the said resistivity changes.

The alternating current output of the thus controlled vacuum tube oscillatory circuit is impressed through the connecting conductors 45 and 46 upon the piezoelectric crystal 20 which lies between the electrodes 21 and 22. Since it is the property of a piezoelectric crystal to change its linear dimensions in accordance with a function of the impressed electric potential upon its surfaces, the piezoelectric crystal 20 will be set into vibration at a frequency corresponding to that of the output of the vacuum tube oscillatory circuit. The piezoelectric crystal thus set into vibration transfers these vibrations to the surrounding material which, in the present case, as illustrated in Fig. 4, comprises the oil, the metal diaphragm 27, the drilling fluid within the collar 29 below the bail 32 and thence to the drilling fluid column within the drill hole and to the surrounding formation in succession.

The vibrations thus transferred to the drilling fluid within the hole and the surrounding formation will be transmitted upwardly to the earth surface where they are received by means of the electrical pickup devices M placed either at the surface of the drilling fluid shown at 60 or upon the earth surface as shown at 61. When employing the piezoelectric crystal pickup device or crystal microphone, the process is in reverse to that employed for generating the vibrations at the instrument within the bore hole. That is, the earth or mud vibrations are received and transferred to the piezoelectric crystal surfaces as vibrational pressure changes resulting in corresponding fluctuating potentials to be generated upon these crystal surfaces and these small potential difference fluctuations are then transferred through the conductor 67 to the amplifier A where a greatly magnified alternating current of corresponding characteristic is generated.

This greatly magnified alternating current is conducted through 68 to the frequency meter F which is capable of discriminating between the different frequency characteristics of the thus amplified current. The frequency meter F may be of any of the well known types such as for example one similar to that commonly employed for measuring high frequency electrical currents such as the wave meter. Such a frequency meter generally comprises an electrical oscillatory circuit of variable natural frequency characteristics and means such as a galvanometer to indicate resonant conditions. The frequency characteristics of such an apparatus are generally varied by means of a variable capacity. Such a frequency measuring device may be here employed and if desired the variable capacity adjustment for determining the condition of resonance may be directly calibrated in terms of resistivity measurements within the bore hole.

Other measurements besides resistivity within a bore hole are desirable, however, as stated before. For example, the dielectric characteristics of the surrounding formations within a bore hole can be measured. When such dielectric measurements are to be made the electrical apparatus diagrammatically shown within the dotted enclosure 15 of Fig. 3 is substituted for that of Fig. 2. In this case the inductance L is directly connected through the condenser 44 and through the conductors 49 and 50 to the cylindrical metal electrode surfaces 12 and 12a. The surfaces 12 and 12a thus act as plates of a condenser, the capacity of which is in shunt to the inductance L of the thermionic vacuum tube oscillatory circuit, and they are charged by the oscillatory current generated thereby. Since the current by which the electrodes 12 and 12a are thus directly energized is of high frequency, the effects of the presence of adjacent formations upon the effective capacity between the electrodes 12 and 12a and across the inductances L, is that predominantly due to their dielectric properties.

The portion of the penetrated formations adjacently extending betwen the electrode surfaces 12 and 12a and included in the electric field therebetween, constitutes that elementary formation unit which is tested for each given instrument position within the bore hole. Dotted line 13 indicates the approximate path of the electric field through the formation.

Changes in dielectric properties of adjacent formations during motion of the testing apparatus within the bore hole, therefore, effects a change in the capacity across the inductance L and thereby changes the frequency of oscillation of the vacuum tube oscillatory circuit. This variable frequency electrical output of the vacuum tube circuit is in turn impressed upon the piezoelectric crystal 20 and the resulting vibrations transmitted to the earth surface as described hereinabove in connection with Figs. 1, 2 and 4. By moving the instrument through the bore hole a continuous record of changes in dielectric properties throughout any desired length thereof is obtained.

In Fig. 5, instead of directly transferring the crystal vibrations to the drilling fluid at the top of the testing apparatus as described hereinbefore, these vibrations are transferred from the piezoelectric crystal 20 through the oil, the metal diaphragm 27 and the rubber 36 to the metal disk 35 and thence as longitudinal vibrations through the steel supporting cable 10 to the ground surface. The vibrations thus transferred to the steel supporting cable 10 are picked up and transformed to electrical impulses by means of the pickup device M at 62, the vibrations being transferred as before described from the cable through the pulley 63 and through the connecting linkage 64.

Frequencies employed preferably range from approximately 10,000 to 100,000 vibrations per second, the frequencies preferably being above audibility whereby extraneous undesirable noises which might vitiate or interfere with making the proper readings, are largely eliminated from the receiving apparatus. These frequencies from an electrical standpoint are relatively low and therefore large values of inductance and capacity in the variable electrical circuits by which the transmitting vibrations are generated are necessary. For this reason it is sometimes desirable to employ means not only to vary the capacities but also to vary the inductances of the oscillatory circuits as well. Such a variation of a large inductance may be accomplished by appropriately controlled, variable electromagnetic circuits associated with the inductances.

Other measurements which may be made within the bore hole utilizing apparatus similar to that illustrated in Fig. 2 are temperature, pressure, and bore hole inclination.

When fluid temperature measurements are made within the bore hole a temperature-operated device such as a bimetal element thermometer is substituted for the galvanometer shown in Fig. 2. The capacity of the system comprising the two plates 42 and 43 is by this means varied in accordance with changes of temperature. The thermometer is preferably placed in the instrument in a position to readily partake of the temperature of the surrounding drilling fluid and formations.

When it is desired to measure the inclination of the bore hole a pendulum-operated device such as illustrated in Fig. 7 is likewise substituted for the galvanometer G and the movable plates 41 and 42 in Fig. 2 whereby variations in deviations from the vertical of the bore hole in which the instrument is lowered, activates a variation in distance and hence the capacity between the pendulum element 70 and the ring 71 and thus varies the frequency of the vacuum tube oscillator circuit as hereinbefore described. The pendulum 70 is universally pivoted at 72 so that it is free to remain in a vertical position within the instrument W while the ring 71 is rigidly supported in a fixed position therein. Deviation of the instrument from the perpendicular will thus cause the pendulum element 70 to move toward the ring 71 reducing the electrical capacity therebetween as just stated.

While piezoelectric means has been disclosed as the method for generating the mechanical vibrations within the bore hole, other well known means are obviously applicable to the circuits described and illustrated herein. For example, the well known dynamic oscillator or vibrator comprising an electrical circuit in an intense electromagnetic field such as employed for submarine signaling may be employed.

While only a single stage thermionic vacuum tube oscillator is illustrated herein, additional stages of amplification may obviously be employed to obtain a greater intensity of crystal or vibrator excitation.

Instead of employing continuous vibrations which are controlled in frequency according to a function of the measurements to be made within the bore hole, intermittent vibrations may be employed, the time interval of which is similarly a function of the desired measures. Vibrations in the audible frequency range can also be employed.

The foregoing is merely illustrative of the method and apparatus of the invention and is not intended to be limiting. The invention includes any method and apparatus which accomplishes the same results within the scope of the claims.

I claim:

1. A method for transmitting indications of resistivities of the unitary portions of penetrated formations surrounding a bore hole to the earth surface comprising varying the characteristics of an electric current in accordance with said resistivities, converting said electric current into mechanical vibrations of a character corresponding to the character of said current and detecting and receiving said vibrations at the earth surface whereby the resistivities of the unitary portions of penetrated formations surrounding the bore hole may be determined.

2. A method for transmitting resistivity instrument readings from within a bore hole to the surface comprising varying the characteristics of an electric current in accordance with a function of the resistivity instrument reading in the bore hole, converting said current into mechanical vibrations corresponding to the character of said current, and detecting and amplifying said vibrations at the surface whereby the resistivity instrument reading within the bore hole may be determined.

3. A method of transmitting resistivity measurements from within a bore hole to the earth surface comprising varying the characteristics of an electric current in accordance with a function of the said resistivity measurements in the bore hole, converting said current into mechanical vibrations of a character corresponding to said current, transferring said vibrations to the earth formations surrounding the bore hole whereby the said vibrations are transmitted through the formations to the earth surface and detecting and measuring the character of the said vibrations thus transmitted to the earth surface whereby the resistivity measurement within the bore hole may be ascertained.

4. A method for transmitting indications of resistivities of the unitary portions of penetrated formations surrounding a bore hole to the earth's surface comprising generating mechanical vibrations in the bore hole, controlling the frequency of said vibrations in accordance with a known function of said resistivities, transmitting said vibrations from within the bore hole to the earth's surface, detecting said vibrations at the earth's surface and measuring the frequency of said detected vibrations whereby the resistivities of the unitary portions of penetrated formations surrounding the bore hole may be determined.

5. A method of logging resistivities of the unitary portions of penetrated formations surrounding a bore hole comprising varying the frequency of an alternating electrical current in accordance with a function of the resistivity of a unitary portion of the formation surrounding the bore hole, converting said alternating current into mechanical vibrations of a corresponding frequency within the bore hole whereby said mechanical vibrations are transmitted into and through the surrounding earth formations and whereby a portion of the vibrational energy reaches the earth surface, and detecting and measuring the frequency of the mechanical vibrations at the earth surface whereby the resistivities of the said unitary portions of the formation may be determined.

6. A method of logging resistivites of the unitary portions of penetrated formations surrounding a bore hole comprising lowering an instrument which is sensitive to resistivities of unitary portions of the surrounding formations through the bore hole, generating mechanical vibrations within the instrument in the bore hole, controlling the character of said generated vibrations by said instrument in accordance with a function of the said changes of the resistivities of the unitary portions of the surrounding formations as the instrument moves through the bore hole, transferring said mechanical vibrations whereby a portion of the vibrational energy reaches the earth surface and detecting and measuring the changes of the character of the mechanical vibrations at the earth surface which vibrations correspond to the said function of the changes of the resistivities of the unitary portions of the formations surrounding the bore hole.

7. A method of logging resistivities of unitary portions of penetrated formations surrounding a bore hole comprising lowering on a supporting line an instrument which is sensitive to resistivities of unitary portions of the surrounding formations through the bore hole, generating mechanical vibrations within the said instrument in the bore hole, controlling the character of said generated vibrations by said instrument in accordance with a function of the changes of the resistivities of the unitary portions of the surrounding formations as the instrument moves through the bore hole, transferring said mechanical vibrations to the supporting line whereby a portion of the vibrations are transmitted longitudinally through the said line to the earth surface, detecting and measuring the changes of the character of the said vibrations arriving at the earth surface through the said supporting line which vibration changes also correspond in character to the said function of the changes of the resistivities of the unitary portions of the formations surrounding the bore hole.

8. A method for transmitting indications of the resistivities of the unitary portions of penetrated formations surrounding a bore hole to the earth surface comprising generating mechanical vibrations in the bore hole of a character which is a function of said resistivities of the unitary portions of the penetrated formations surrounding the bore hole, transmitting said vibrations from within the bore hole to the earth surface and detecting said vibrations at the earth surface whereby the resistivities of the unitary portions of penetrated formations surrounding the bore hole may be determined.

9. Apparatus for transmitting indications of resistivities of the unitary portions of penetrated formations surrounding a bore hole to the earth surface comprising an instrument adapted to be lowered into a well bore hole, said instrument comprising means for generating an alternating electrical current, means to control the frequency of said alternating current in accordance with a function of the said resistivities of the unitary portions of the penetrated formations surrounding the bore hole to be measured, means to generate mechanical vibrations corresponding in frequency with said alternating current, and means to transmit said mechanical vibrations to the earth surface.

10. Apparatus according to claim 9 in which the means to transmit the mechanical vibrations to the earth surface comprise a line by which the instrument is lowered into the well bore hole.

11. Apparatus for transmitting indications of the resistivities of unitary portions of the penetrated formations surrounding the bore hole comprising an instrument adapted to be lowered into a well bore hole, said instrument comprising a thermionic vacuum tube oscillator, means to vary the frequency of the electrical oscillations of said oscillator in accordance with a function of the variations of resistivities of unitary portions of the penetrated formations surrounding the bore hole as the instrument moves therethrough, electrical means to transform the thus generated and controlled electrical oscillations into mechanical vibrations of corresponding frequency, means to transmit said mechanical vibrations from said instrument in the bore hole to the earth surface and a microphone at the earth surface to receive and transform the vibrations into an alternating current of corresponding frequency, means to amplify said alternating current from the microphone, and means capable of indicating changes in said amplified alternating current frequency.

12. A method according to claim 4 in which the said generated mechanical vibrations are supersonic.

13. Method of transmitting resistivity data from a sub-surface prospecting instrument to surface apparatus that comprises creating an electrical oscillation at the prospecting instrument, altering said oscillation in accordance with resistivity data from said instrument, translating the electrical oscillation into mechanical vibrations, transmitting the vibrations to the surface, analyzing the vibrations at the surface to obtain the desired resistivity data, and operating the indicating apparatus in accordance therewith.

14. Method of transmitting data from a sub-surface prospecting instrument within a well bore to surface apparatus that comprises producing an electrical current at the prospecting instrument, altering characteristics of said current in accordance with resistivity data from said instrument, creating an electrical oscillation, altering said oscillation in accordance with alterations in said current, translating the electrical oscillation into mechanical vibrations, transmitting the vibrations to the surface, analyzing the vibrations at the surface to obtain the desired resistivity data, and operating the indicating apparatus in accordance therewith.

LYLE DILLON.